US008868622B2

(12) United States Patent
Chellam (10) Patent No.: US 8,868,622 B2
(45) Date of Patent: Oct. 21, 2014

(54) METHOD AND APPARATUS FOR ALLOCATING RESOURCES IN A COMPUTER SYSTEM

(75) Inventor: Rajagopal Chellam, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 12/604,719

(22) Filed: Oct. 23, 2009

(65) Prior Publication Data

US 2010/0205397 A1 Aug. 12, 2010

(30) Foreign Application Priority Data

Feb. 11, 2009 (IN) .............................. 293/CHE/2009

(51) Int. Cl.
*G06F 17/30* (2006.01)
*G06F 9/50* (2006.01)

(52) U.S. Cl.
CPC .................................... *G06F 9/5077* (2013.01)
USPC ........... 707/812; 709/226; 711/100; 711/163; 711/153; 707/802; 707/809; 707/810

(58) Field of Classification Search
CPC ......................... G06F 9/5077; G06F 17/30486
USPC .................. 707/812, 802, 809, 810; 709/226; 711/100, 163, 153
See application file for complete search history.

(56) References Cited

U.S. PATENT DOCUMENTS

| 7,882,326 B2 * | 2/2011 | Armstrong et al. ........... 711/173 |
| 8,010,673 B2 * | 8/2011 | Dea et al. ...................... 709/226 |
| 2006/0005189 A1 * | 1/2006 | Vega et al. ........................ 718/1 |
| 2006/0075204 A1 * | 4/2006 | Kumar ........................... 711/173 |
| 2007/0073782 A1 | 3/2007 | Nakatani et al. |
| 2008/0104077 A1 * | 5/2008 | Gimpl et al. ....................... 707/8 |
| 2008/0177810 A1 * | 7/2008 | Devarakonda et al. ....... 707/205 |
| 2009/0089781 A1 * | 4/2009 | Shingai et al. .................... 718/1 |
| 2009/0150640 A1 * | 6/2009 | Royer et al. ................... 711/173 |
| 2009/0222640 A1 * | 9/2009 | Bauman et al. ................ 711/173 |
| 2009/0307456 A1 * | 12/2009 | Patwari et al. ................ 711/173 |
| 2010/0094948 A1 * | 4/2010 | Ganesh et al. ................ 709/212 |

FOREIGN PATENT DOCUMENTS

WO  WO-2007099636  7/2007

* cited by examiner

*Primary Examiner* — Apu Mofiz
*Assistant Examiner* — Cindy Nguyen (57) ABSTRACT

Embodiments of the present invention provide a computer system, comprising at least two logical partitions, each partition having allocated computing resources, wherein the computing resources allocated to a first partition include memory storing a file system accessible by processes executing in the first partition; and a partition resource allocator, wherein the partition resource allocator is arranged to migrate the memory storing the file system from the first partition to a second partition, such that the file system is accessible by processes executing in the second partition.

19 Claims, 6 Drawing Sheets

METHOD AND APPARATUS FOR ALLOCATING RESOURCES IN A COMPUTER SYSTEM

BACKGROUND

A computer system comprises a set of computing resources, such as memory, processors, I/O devices etc. The computing resources may be divided or distributed amongst a plurality of logical partitions of the computer system. A plurality of workloads, e.g. processes, may also be distributed amongst the plurality of partitions to efficiently distribute a computing workload created by those processes amongst the computing resources. Computing resources and processes may be migrated or transferred between the partitions, effectively resizing each partition, to redistribute a dynamically varying workload amongst the computing resources.

However, it is difficult to ensure that one or more processes migrated between partitions continue to have access to data being utilised by the processes. In particular, a problem may arise when a plurality of processes which are cooperatively or simultaneously acting upon the same data are migrated between partitions.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

An embodiment of the present invention will now be described with reference to FIGS. 1 and 2.

Figure 1:
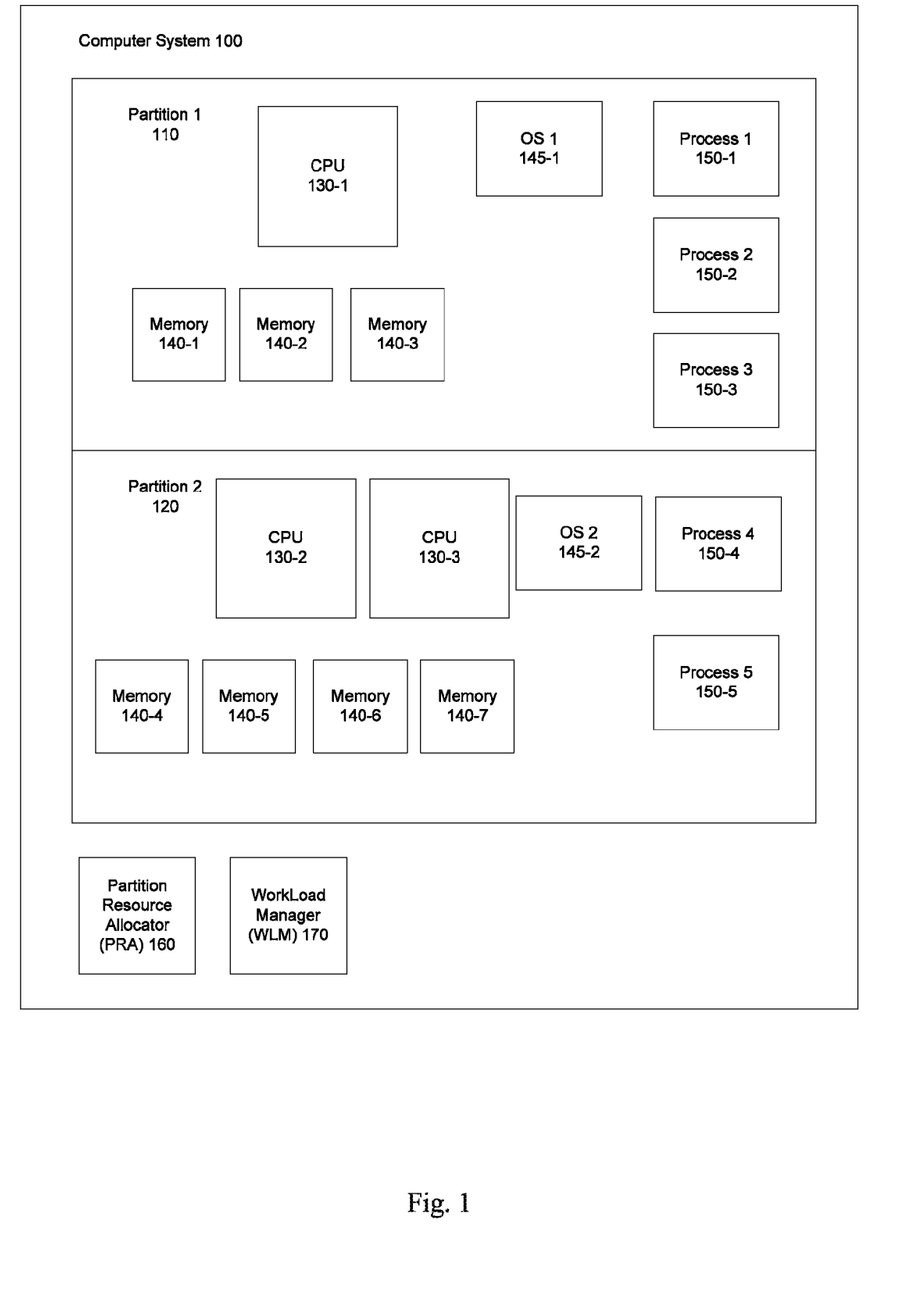
FIG. 1 shows an illustration of a computer system according to an embodiment of the present invention.

FIG. 1 illustrates a distribution of computing resources and workloads in a computer system 100 which has two logical partitions 110, 120. The computing resources of the computer system 100 comprise three processors 130 and seven memory units 140. The computing resources may also include I/O devices, such as communication adapters e.g. LAN cards, and other communication or data input/output devices although these are not shown for clarity. Furthermore, whilst the computer system 100 has been described as comprising two partitions 110, 120, it will be realised that this number is merely illustrative and any number of partitions may be supported. Still further, the logical partitions 110, 120 need not be formed by computing resources located on a single physical computer system; instead they may be formed by computing resources of a plurality of computer systems. The computer system 100 further comprises a partition resource allocator (PRA) 160 which controls the allocation of computer resources amongst the logical partitions. The PRA 160 may control the allocation of resources in response to information received from a partition manager, which is not shown for clarity. A workload manager (WLM) 170 is responsible for distributing workloads or processes amongst the partitions 110, 120.

Each of the partitions 110, 120 supports its own operating system 145. The operating system 145 of each partition may be the same, different versions of the same operating system or entirely different operating systems. The two partitions 110, 120 jointly support execution of five processes 150.

As shown in FIG. 1, a first 110 partition currently has allocated to it one of the processors 130-1, three memory units 140-1, 140-2, 140-3 and supports the execution of three of the processes 150-1, 150-2, 150-3. A second partition 120 has allocated to it two of the processors 130-2, 130-3, four memory units 140-4, 140-5, 140-6, 140-7 and supports the execution of two of the processes 150-4, 150-5.

In this example, the second and third processes 150-2, 150-3 jointly operate on data stored in memory allocated to the first partition 110.

Figure 2:
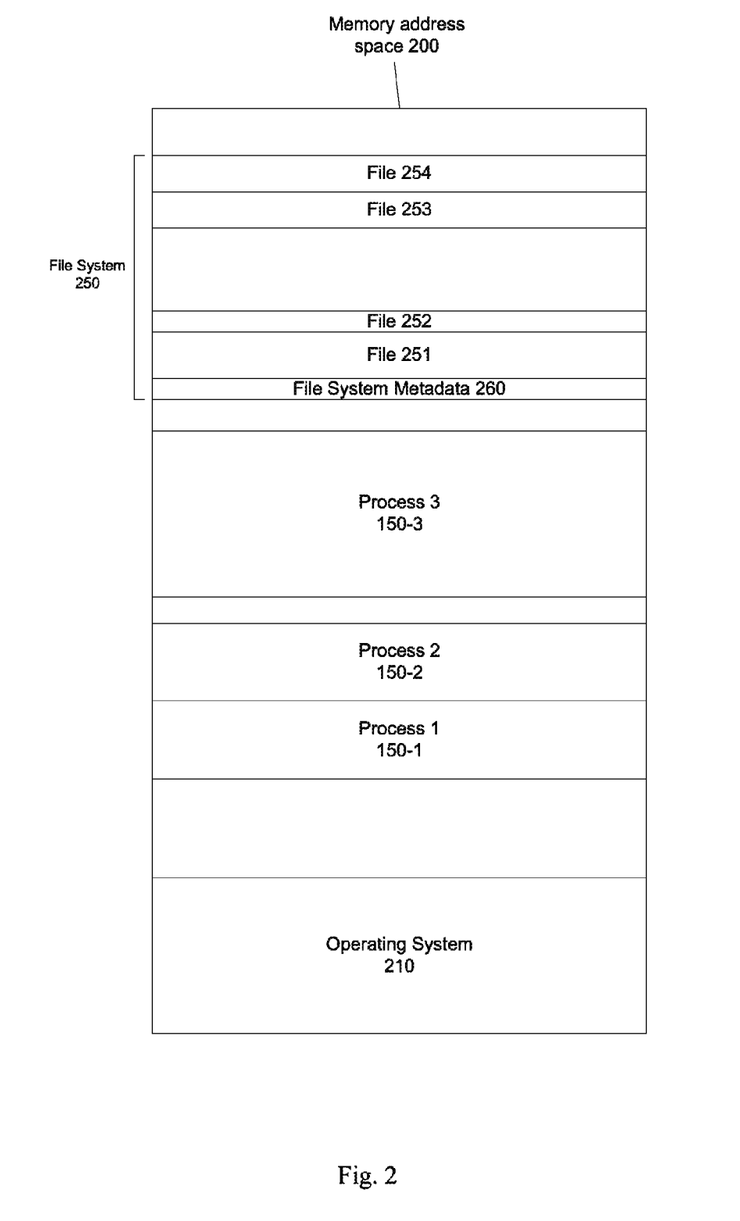
FIG. 2 shows an illustration of a memory address space of a partition according to an embodiment of the present invention.

FIG. 2 shows an illustration of a memory address space 200 of the first partition 110. It will be realised that the memory allocated to the first partition is formed, at least in part, by the memory units 140-1, 140-2, 140-3 allocated to the first partition 110. The address space 200 may also include memory which is permanently allocated to the first partition 110.

The address space 200 stores data related to the operating system 210 of the first partition 110 and data related to each of the first, second and third processes 150-1, 150-2, 150-3 executing within the first partition 110. It will be noted that the data of the operating system 210 and processes 150-1, 150-2, 150-3 is not necessarily contiguously stored in the address space 200 and the data areas may be of the same or different sizes.

The address space 200 also stores a memory-resident file system 250. The file system 250 stores data in one or more files 251-254 and is used by the second and third processes 150-2, 150-3 to hold jointly utilised data. The file system 250 may also be used by the first process 150-1 although, as will be explained, once migrated the file system 250 will no longer be available to the first process 150-1. As illustrated, the file system 250 stores file system metadata 260 and four files 251, 252, 253, 254 at least some of which are shared by the second and third processes 150-2, 150-3. The metadata 260 is control and attribute information used to maintain a state of the file system 250.

During operation of the computer system 100, it may be desired to migrate, that is to transfer the execution of, the second and third processes 150-2, 150-3 from the first partition 110 to the second partition 120. For example, a system administrator may decide to migrate the processes 150-2, 150-3, or the WLM 170 may determine that the resources of the computer system 100 would be better utilised by supporting a different distribution of processes amongst the partitions 110, 120 and consequently may determine to migrate the processes 150-2, 150-3 from the first partition 110 to the second partition 120.

In embodiments of the invention, in order to allow one or more migrated processes 150-2, 150-3 to access data utilised by those processes 150-2, 150-3, the memory-resident file system 250 storing data used by the processes is also migrated to the second partition 120. The file system 250 is migrated within one or more memory units storing the file system 250. That is, a memory portion, within which the file system 250 is located, is migrated alongside the processes. Thus, the file system 250 is not transferred from memory allocated to the first partition 110 to memory allocated to the second partition 120. In contrast, the memory holding the file system 250 is reallocated from the first partition 110 to the second partition 120. This is particularly useful for ensuring that a plurality of processes acting upon the same data continue to have access to that data following migration. Advantageously, this avoids a need to store, even temporarily, the data within the file system 250 in a permanent store, such as in a hard drive available to the computer system 100, or to transfer the data through a network or communications bus between the logical partitions 110, 120.

Figure 3:
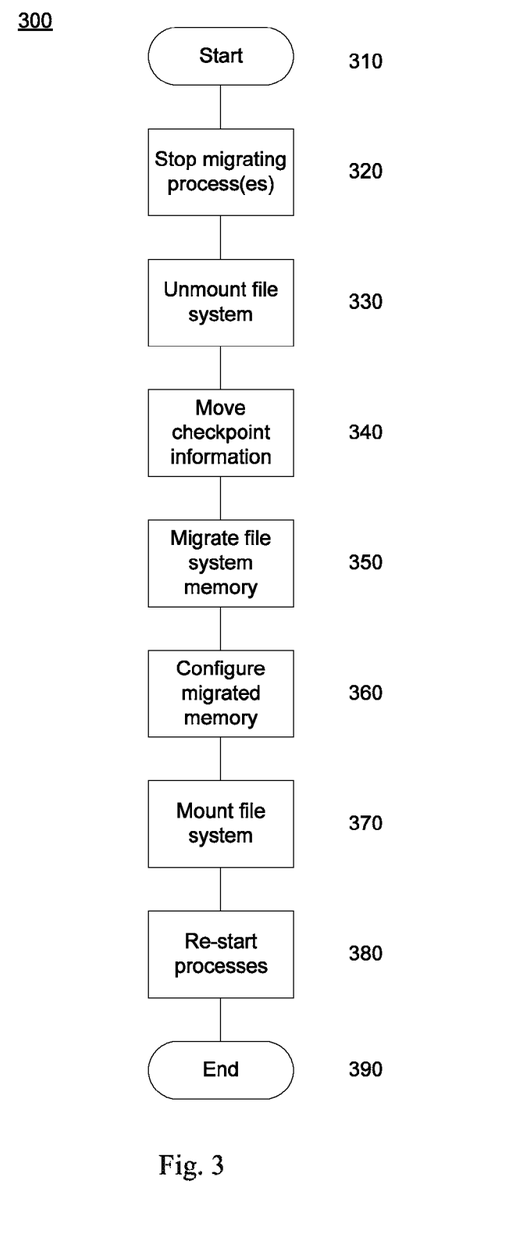
FIG. 3 shows a method according to an embodiment of the present invention.

FIG. 3 shows a method 300 of an embodiment of the present invention for migrating processes between partitions 110, 120 of the computer system 100.

The method begins in step 310 wherein it has been determined to migrate or transfer one or more processes between partitions of a computer system. For example, it has been determined to migrate the second and third processes 150-2, 150-3 from the first partition 110 to the second partition 120 of the computer system 100.

In step 320 the processes 150-2, 150-3 to be migrated are stopped. The WLM 170 may checkpoint the processes 150-2, 150-3 in the first partition 110 to allow them to be restarted from a checkpoint position. Checkpointing involves the processes 150-2, 150-3 storing state information which allows them to be restarted from the checkpoint position. The state information may be stored in a checkpoint file in the file system 250 or in any other location which is, or can be made, accessible from within the second partition 120. In step 320, the PRA 160 may communicate an indication to the file system 250 that it is to be migrated to the second partition 120.

In step 330 the file system 250 is un-mounted. The operating system 210 of the first partition 110 un-mounts the file system 250 in step 330. The un-mounting of the filing system within the first partition 110 may be forced by the PRA 160. In step 340, the state information is moved to the second partition 120 if it is stored external to the file system 250. That is, if the state information has been stored within the file system 250 in step 320, then it does not need moving to the second partition 120 separately from the file system 250. However, if the state information has been stored elsewhere, for example in a file on a storage device, then it may require moving to be accessible within the second partition 120.

In step 350 the one or memory units storing the file system 250 are migrated from the first partition 110 to the second partition 120. In one embodiment, the PRA 160 determines which memory units 140-1, 140-2, 140-3 need to be reallocated to the second partition 120 in order to migrate the file system 250. That is, the PRA 160 may determine which memory units physically store the file system 250. In order to migrate the file system 250, the one or more memory units in which the file system 250 stored must be capable of migrating, or being reallocated, from the first partition 110 to the second partition 120 without destroying data stored therein i.e. non-destructively. Step 350 may comprise moving the file system 250 within the address space 200 into one or migratable memory units 140-1, 140-2, 140-3. Furthermore, step 350 may comprise moving the file system 250 within the address space to reduce a number of memory units that require migration to the second partition 120. For example, if the file system 250 is of such a size that it may fit within a minimum number of migrateable memory units, but due to its current location within the address space 200 more than the minimum number of memory units would need to be migrated, then the file system 250 may be moved within the address space to occupy the minimum number of memory units. From the points of view of the respective partitions 110, 120, step 350 comprises the first partition 110 migrating or releasing the memory units containing the file system 250 and the second partition 120 receiving the memory units containing the file system 250.

In step 360 the one or more memory units migrated from the first partition 110 to the second partition 120 are configured for use within the second partition 120. In this step, the migrated memory units are added to an address space of the second partition 120. The memory units may be designated within the second partition 120 as being a memory resource or address space dedicated for use by the memory-resident file system 250 so that an operating system 145-2 of the second partition 120 does not attempt to write other data to that portion of the address space.

In step 370 the operating system 145-2 of the second partition 120 mounts the file system 250. The operating system 145-2 may be provided with a starting memory address and information indicating a size of the file system 250. Step 370 may comprise establishing internal file-related data structures. Following the mounting of the file system 250, data stored in the file system 250 is available for use within the second partition 120.

In step 380 the one or more processes 150-2, 150-3 which have been migrated from the first partition 110 to the second partition 120 are restarted from the checkpoint position using the state information. As part of the restarting of the processes 150-2, 150-3, files 251-254 stored in the file system 250 are mapped for use by the processes 150-2, 150-3 in the second partition 120.

Any process executing within the second partition 120 may access the file system 250. However, once the processes jointly using data stored in the file system 250 have finished execution, or at least have finished acting upon the data in the file system 250, the file system 250 may be un-mounted. The file system 250 may be re-mounted and utilised in at a later point in time, or the address space occupied by the file system 250 may be designated as useable, or un-dedicated to the file system 250, so that the address space may be utilised by the operating system of the second partition for other purposes.

Figure 4:
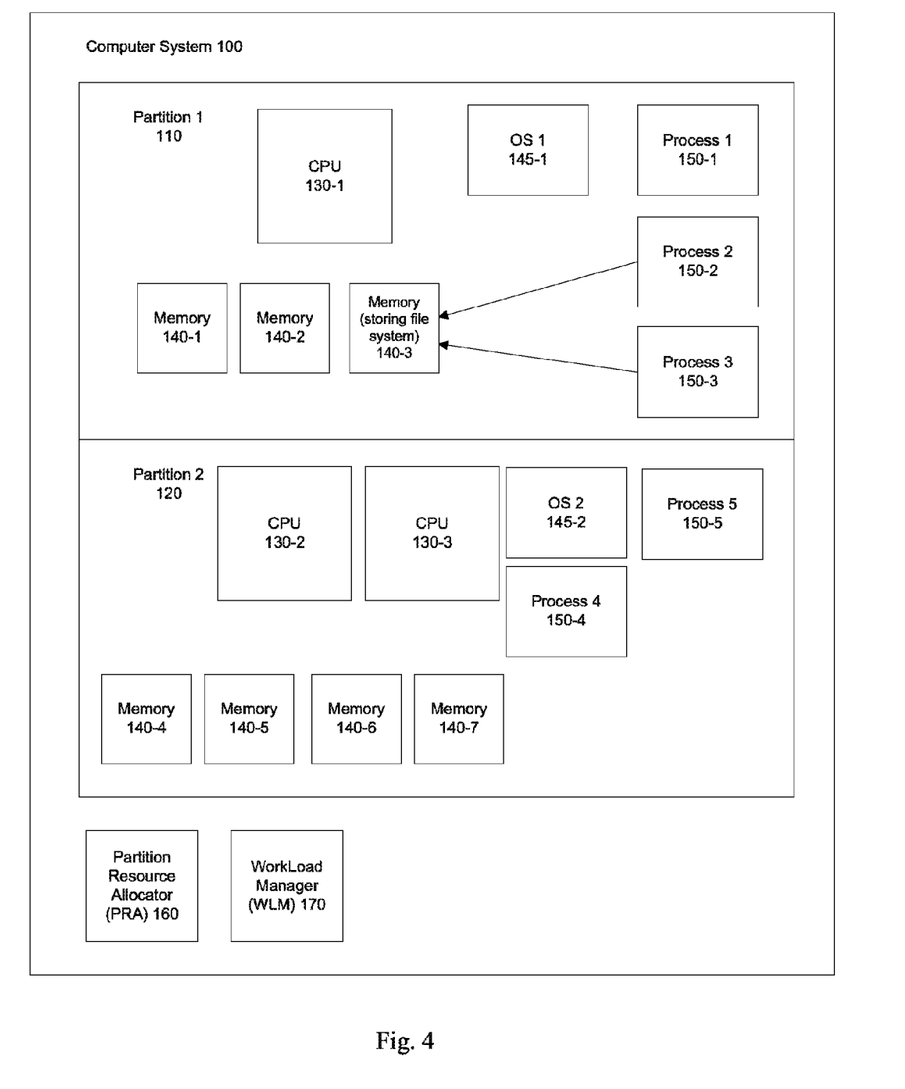
FIG. 4 shows an illustration of a computer system according to an embodiment of the invention prior to the method illustrated in FIG. 3.
Figure 5:
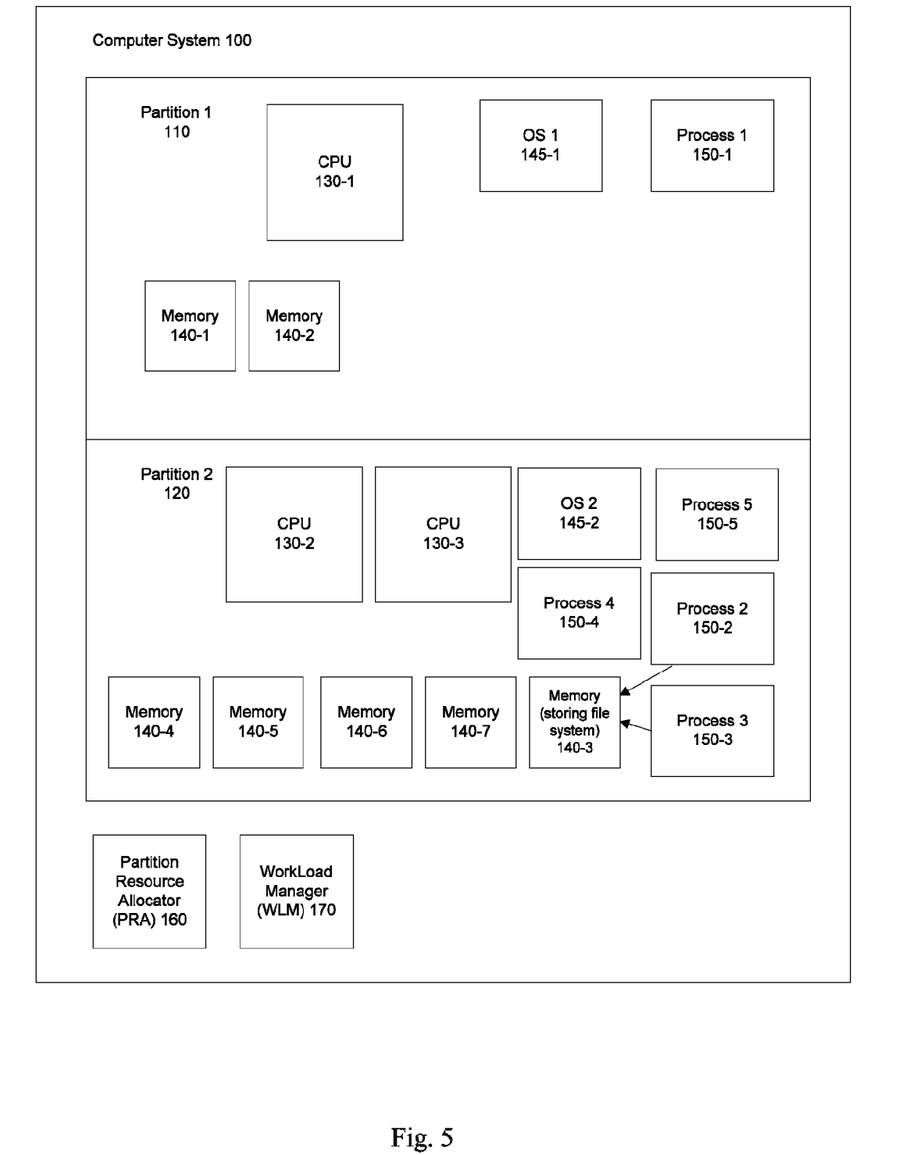
FIG. 5 shows an illustration of a computer system according to an embodiment of the invention following the method illustrated in FIG. 3.

As an example, FIGS. 4 and 5 are before and after illustrations respectively of process migration according to an embodiment of the invention. In FIG. 4, processes 2 and 3 150-2, 150-3 are jointly utilising data which is stored in the file system 250 which is held in memory unit 140-3. Following migration of processes 150-2, 150-3 and memory unit 140-3 storing the file system to the second partition 120, the processes 150-2, 150-3 are operable within the second partition 120 and are able to access the file system 250 contained within memory unit 140-3 which has also been migrated.

Figure 6:
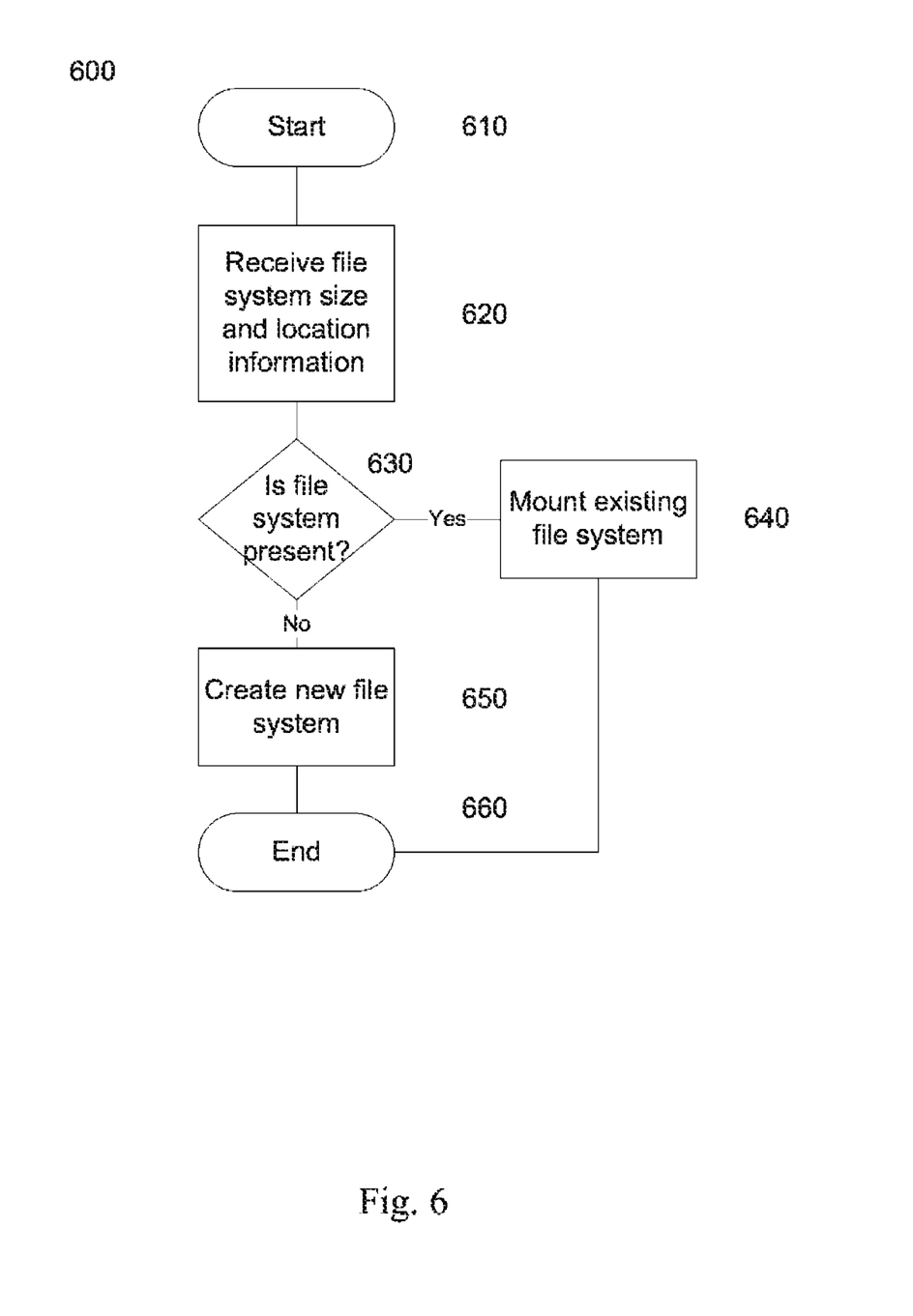
FIG. 6 shows a further method according to an embodiment of the present invention.

FIG. 6 illustrates a method 600 of creating a memory resident file system 250 according to an embodiment of the present invention.

The method begins in a first step 610. In step 620 an operating system of a partition in which the file system is to be created receives information indicating start location and a size of the file system 250. The start location indicates a memory address at which the file system 250 is to begin. The size of the file system 250 may indicate a maximum size to which the file system 250 is allowed to grow to in memory. Step 620 may further comprise receiving information which indicates a type of file system 250 to be stored in memory which is capable of migration.

In step 630 the operating system checks whether an existing file system exists at the start location received in step 630. The operating system may also check whether a file system exists within a defined memory range between the start location and an end memory address calculated by start_memory_address+file_system_size. If a file system is detected in step 630 then the operating system may mount the existing file system in step 640 so that data stored therein is accessible to processes executing in the partition. However, if no file system is detected in step 630 then the method moves to step 650.

In step 650 a file system is created by the operating system. The operating system creates the file system by allocating a contiguous address space of the size specified in step 620 from the start location. The operating system creates the file system by creating a superblock and any other metadata structures necessary for the file system within memory. As part of this process, the operating system may map the virtual address space to dedicated physical memory. The newly created file system determines a suitable location and layout of metadata necessary to maintain the state of the file system and file data organisation. The file system is able to grow and shrink within the maximum memory size allocated to it as data is stored or deleted from the file system. The file system maintains block map information and allocates blocks in terms of pages from free locations to write data. File access operations may be handled by a vnode as with a disk-based file system. The method ends in step 660.

Whilst embodiments of the present invention have been described with reference to the migration of a file system which is access by a plurality of processes acting on data stored within the file system, it will be realised that embodiments of the present invention may relate to migration of a file system alone, or alongside a single process which utilises data stored in the file system.

Advantageously, embodiments of the present invention increase data mobility between partitions in a computer system, particularly to pluralities of processes which jointly access the same data. Furthermore, embodiments of the present invention do not require that a file system be made available via either a network mount operation or a cluster file system to a partition to which one or more processes migrate.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer system, comprising:
a first and second logical partition, each partition having allocated computing resources, wherein the computing resources allocated to the first logical partition include memory storing a file system accessible by processes executing in the first logical partition; and
a partition resource allocator to migrate the memory storing the file system from the first logical partition to the second logical partition in response to a process executing in the first logical partition being migrated to the second logical partition, wherein the file system is accessible by processes executing in the second logical partition;
the partition resource allocator further to determine a number of reallocatable units of memory necessary to hold the file system in the memory and move the file system within the memory to reside in a reduced number of units of memory sufficient to hold the file system.

2. The computer system of claim 1, wherein the memory storing the file system includes one or more memory units which are migrated from the first logical partition to the second logical partition while storing the file system.

3. The computer system of claim 1, wherein the first logical partition supports one or more processes which utilize the file system to store data and the one or more processes are migrated from the first logical partition to the second logical partition.

4. The computer system of claim 3, wherein the one or more processes are a plurality of processes which utilize the same data stored in the file system.

5. The computer system of claim 1, wherein the file system comprises data stored in one or more files and metadata for storing file system information.

6. The computer system of claim 1, wherein the first and second logical partitions each comprise an operating system, wherein the operating system of the first logical partition is arranged to unmount the file system stored in the memory prior to the memory being migrated, and the operating system of the second logical partition is arranged to mount the file system following migration of the memory.

7. The computer system of claim 1, wherein the file system is not written to another storage device while the memory is being migrated.

8. A method of managing resources in a computer system, comprising:
storing a file system in memory allocated to a first logical partition of the computer system, wherein the file system is useable by processes executing within the first logical partition to store data;
migrating the memory storing the file system to a second logical partition of the computer system in response to a process executing in the first logical partition being migrated to the second logical partition, wherein the file system is useable by processes executing within the second logical partition to store data;

determining a number of reallocatable units of memory necessary to hold the file system in the memory; and moving the file s stem within the memory to reside in a reduced number of units of memory sufficient to hold the file system.

9. The method of claim 8, wherein the memory is migrated to the second logical partition while storing the file system.

10. The method of claim 8, comprising:

stopping one or more processes within the first logical partition which access data in the file system;

migrating the one or more processes from the first logical partition to the second logical partition; and restarting execution of the one or more processes within the second logical partition, wherein the processes continue to access data stored in the file system.

11. The method of claim 10, comprising:

storing state information for each of the one or more processes, wherein the state information relates to a state of each process at a checkpoint position; and the step of restarting execution of the one or more processes comprises utilizing the state information to restart execution of each process from the checkpoint position.

12. The method of claim 8, comprising:

unmounting the file system by an operating system of the first logical partition; and mounting the file system by an operating system of the second logical partition.

13. The method of claim 8, wherein the file system is non-destructively retained in the memory while being migrated.

14. The method of claim 8, comprising determining one or more memory units which store the file system and migrating to the second logical partition only those memory units storing the file system.

15. The method of claim 14, comprising moving the file system within an address space of the first logical partition, wherein only a minimum number of memory units require migration to the second logical partition.

16. A method of dynamically changing an allocation of resources in a computer system, comprising:

reallocating one or more units of memory having a file system stored therein from a first logical partition to a second logical partition of the computer system in response to a process executing in the first logical partition being migrated to the second logical partition, while the file system is resident in the one or more memory units, wherein the file system is useable by processes executing within the second logical partition; and determining a number of reallocatable units of memory necessary to hold the file system in memory; and moving the file s stem within memory to reside in a reduced number of units of memory sufficient to hold the file system.

17. The method of claim 16, comprising:

moving one or more processes utilizing the file system to store data from the first logical partition to the second logical partition of the computer system.

18. The method of claim 17, comprising storing checkpoint information enabling the one or more processes to restart within the second logical partition from a checkpoint position.

19. The method of claim 16, comprising unmounting the file system in the first logical partition prior to the reallocation and mounting the file system in the second logical partition following the reallocation.

* * * * *

UNITED STATES PATENT AND TRADEMARK OFFICE
CERTIFICATE OF CORRECTION

PATENT NO.         : 8,868,622 B2
APPLICATION NO.    : 12/604719
DATED              : October 21, 2014
INVENTOR(S)        : Rajagopal Chellam

It is certified that error appears in the above-identified patent and that said Letters Patent is hereby corrected as shown below:

In the Claims,

In column 7, line 6, in Claim 8, delete "s stem" and insert -- system --, therefor.

In column 8, line 20, in Claim 16, delete "s stem" and insert -- system --, therefor.

Signed and Sealed this
Twenty-fifth Day of August, 2015

Michelle K. Lee
*Director of the United States Patent and Trademark Office*